(12) United States Patent
Hidaka et al.

(10) Patent No.: US 8,270,464 B2
(45) Date of Patent: Sep. 18, 2012

(54) DECISION FEEDBACK EQUALIZER (DFE)

(75) Inventors: Yasuo Hidaka, Cupertino, CA (US); Weixin Gai, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 576 days.

(21) Appl. No.: 12/488,777

(22) Filed: Jun. 22, 2009

(65) Prior Publication Data

US 2009/0316769 A1 Dec. 24, 2009

Related U.S. Application Data (60) Provisional application No. 61/074,383, filed on Jun. 20, 2008.

(51) Int. Cl.
*H03H 7/30* (2006.01)

(52) U.S. Cl. ......... 375/233; 375/346; 375/327; 375/348

(58) Field of Classification Search .................. 375/233, 375/327, 348, 346
See application file for complete search history.

(56) References Cited

U.S. PATENT DOCUMENTS

| | | | |
|---|---|---|---|
| 4,328,585 A | 5/1982 | Monsen |
| 4,730,343 A | 3/1988 | Kanemasa |
| 6,111,431 A | 8/2000 | Estrada |
| 6,262,606 B1 | 7/2001 | Tamjidi |
| 6,313,662 B1 | 11/2001 | Ide |
| 6,341,360 B1 | 1/2002 | Abdelilah |
| 6,353,334 B1 | 3/2002 | Schultz |
| 6,370,190 B1 | 4/2002 | Young |
| 6,388,477 B1 | 5/2002 | Juang |
| 6,911,841 B2 | 6/2005 | Lee |
| 6,930,506 B2 | 8/2005 | Cranford, Jr. |
| 6,990,644 B2 | 1/2006 | Feng |
| 6,992,508 B2 | 1/2006 | Chow |
| 7,135,887 B1 | 11/2006 | Shumarayev |
| 7,138,825 B2 | 11/2006 | Kim et al. |
| 7,236,013 B2 | 6/2007 | Kasanyai |
| 7,268,623 B2 | 9/2007 | Kim |
| 7,301,371 B2 | 11/2007 | Kim |
| 7,313,182 B2 | 12/2007 | Fimoff |
| 7,427,878 B2 | 9/2008 | Jiang |
| 7,576,567 B2 | 8/2009 | Jiang |
| 7,579,872 B2 | 8/2009 | Jiang |
| 2003/0189998 A1 | 10/2003 | Phanse |
| 2003/0223489 A1 | 12/2003 | Smee |
| 2004/0151239 A1 | 8/2004 | Koyanagi et al. |
| 2004/0151240 A1 | 8/2004 | Hidaka |

(Continued)

OTHER PUBLICATIONS

Office Action for U.S. Appl. No. 12/489,356, Nov. 10, 2011.

(Continued)

*Primary Examiner* — David Ometz
*Assistant Examiner* — Rahel Guarino
(74) *Attorney, Agent, or Firm* — Baker Botts L.L.P.

(57) ABSTRACT

In one embodiment, a method includes receiving an input signal from a receiver, receiving a data clock (DCLK) signal, and receiving a boundary clock (BCLK) signal. The method includes, based on the input signal and the DCLK signal, recovering data from the input signal to produce a first output signal. The method includes, based on the input signal and the BCLK signal, recovering boundaries between bits in the input signal to produce a second output signal. The method includes, based on the first and second output signals, producing the DCLK and BCLK signals, with the DCLK signal being delayed with respect to the BCLK signal less than approximately 0.5 unit intervals (UIs) and greater than or equal to approximately zero UIs.

21 Claims, 8 Drawing Sheets

U.S. PATENT DOCUMENTS

| | | | |
|---|---|---|---|
| 2004/0151268 A1 | 8/2004 | Hidaka | |
| 2004/0153898 A1 | 8/2004 | Hidaka | |
| 2004/0155643 A1 | 8/2004 | Hidaka | |
| 2004/0156432 A1 | 8/2004 | Hidaka | |
| 2004/0233976 A1 | 11/2004 | Han | |
| 2004/0257127 A1 | 12/2004 | Levin | |
| 2004/0264562 A1 | 12/2004 | Wu | |
| 2005/0047500 A1 | 3/2005 | Gupta et al. | |
| 2005/0135471 A1* | 6/2005 | Tonietto et al. | 375/233 |
| 2005/0184801 A1 | 8/2005 | Gai et al. | |
| 2005/0185710 A1 | 8/2005 | Gai et al. | |
| 2005/0226355 A1 | 10/2005 | Kibune et al. | |
| 2005/0238092 A1 | 10/2005 | Ng | |
| 2005/0254565 A1 | 11/2005 | Sivadas et al. | |
| 2006/0291457 A1 | 12/2006 | Hidaka | |
| 2007/0110147 A1 | 5/2007 | Koyanagi | |
| 2007/0195874 A1* | 8/2007 | Aziz et al. | 375/233 |
| 2007/0280341 A1 | 12/2007 | Hidaka | |
| 2007/0280342 A1 | 12/2007 | Hidaka | |
| 2007/0280383 A1 | 12/2007 | Hidaka | |
| 2007/0280384 A1 | 12/2007 | Hidaka | |
| 2007/0280389 A1 | 12/2007 | Hidaka | |
| 2007/0280390 A1 | 12/2007 | Hidaka | |
| 2007/0280391 A1 | 12/2007 | Hidaka | |
| 2007/0297209 A1 | 12/2007 | Hidaka | |
| 2007/0297248 A1 | 12/2007 | Hidaka | |
| 2007/0300119 A1 | 12/2007 | Hidaka | |
| 2008/0056344 A1 | 3/2008 | Hidaka | |
| 2008/0143326 A1 | 6/2008 | Voisine | |
| 2008/0198916 A1* | 8/2008 | Zeng et al. | 375/233 |
| 2009/0086809 A1 | 4/2009 | Hidaka | |
| 2009/0086810 A1 | 4/2009 | Hidaka | |
| 2009/0086989 A1 | 4/2009 | Hidaka | |
| 2009/0140778 A1 | 6/2009 | Kikuchi | |
| 2009/0316767 A1 | 12/2009 | Hidaka | |
| 2009/0316770 A1 | 12/2009 | Hidaka | |
| 2009/0316771 A1 | 12/2009 | Hidaka | |
| 2009/0316772 A1 | 12/2009 | Hidaka | |

OTHER PUBLICATIONS

Office Action for U.S. Appl. No. 12/489,370, Nov. 25, 2011.

Ng et al., "Low Power Gbit/sec Low Voltage Differential Signaling I/O System," Electrical Engineering and Computer Science, University of California, Berkeley, http://www.ocf.berkeley.edu/~eng/classes/241Report.pdf, Jun. 29, 2006.

Office Action for U.S. Appl. No. 12/488,790, Jul. 22, 2010.

Troy Beukema, et al: "A 6.4-Gb/s CMOS SerDes Core with Feed-Forward and Decision-Feedback Equalization," IEEE Journal of Solid-State Circuits, vol. 40, No. 12, pp. 2633-2645, Dec. 2005.

Robert Payne, et al: "A 6.25-Gb/s binary transceiver in 0.13-um CMOS for Serial Data Transmission Across High Loss Legacy Backplane Channels," IEEE Journal of Solid-State Circuits, vol. 40, No. 12, pp. 2646-2657, Dec. 2005.

Song Wu, et al: "Design of a 6.25 Gbps Backplane SerDes with TOP-down Design Methodology," Proceedings of DesignCon 2004, 11-TA1, Santa Clara, CA, Feb. 2004.

Office Action for U.S. Appl. No. 13/489,348, Dec. 16, 2011.

* cited by examiner

DECISION FEEDBACK EQUALIZER (DFE)

RELATED APPLICATION

This application claims the benefit, under 35 U.S.C. §119 (e), of U.S. Provisional Patent Application No. 61/074,383, entitled Decision Feedback Equalizer, filed 20 Jun. 2008.

TECHNICAL FIELD

This disclosure relates generally to electrical communication.

BACKGROUND

A transmission channel may distort high-frequency (HF) signals communicated through it. The distortion may be a result of frequency-dependent signal attenuation caused, for example, by skin effect or dielectric effect in the transmission channel and may vary according to one or more characteristics of the transmission channel, such as a length or an insulator material of the transmission channel. To compensate for the distortion, a transmitter transmitting signals through the transmission channel may include a pre-emphasis driver. A receiver receiving the signals through the transmission channel may include one or more equalizers.

DESCRIPTION OF EXAMPLE EMBODIMENTS

A transmission channel may distort high-frequency (HF) signals communicated through it. The distortion may be a result of frequency-dependent signal attenuation caused, for example, by skin effect or dielectric effect in the transmission channel and may vary according to one or more characteristics of the transmission channel, such as a length or an insulator material of the transmission channel. To compensate for the distortion of HF signals communicated through a transmission channel, a receiver receiving the signals through the transmission channel may include one or more equalizers to increase the effective length of the transmission channel or to increase communication speed. For example, a receiver may include a DFE, which tend to have greater noise immunity than LEs. A DFE requires parameters specifying the amount of components to apply to the received signals. Adaptive parameters are often desirable because one or more of the characteristics of the transmission channel are often unknown. In particular, it is often desirable to have the DFE apply an amount of compensation that matches the level of attenuation of the received signals from communication across the transmission channel, so that output characteristics of the received signals remain consistently independent of the transmission channel.

The present disclosure incorporates by reference U.S. Patent Application Publication No. 2007/0280383, published 6 Dec. 2007, entitled *System and Method for Adjusting Compensation Applied to a Signal*.

Figure 1:
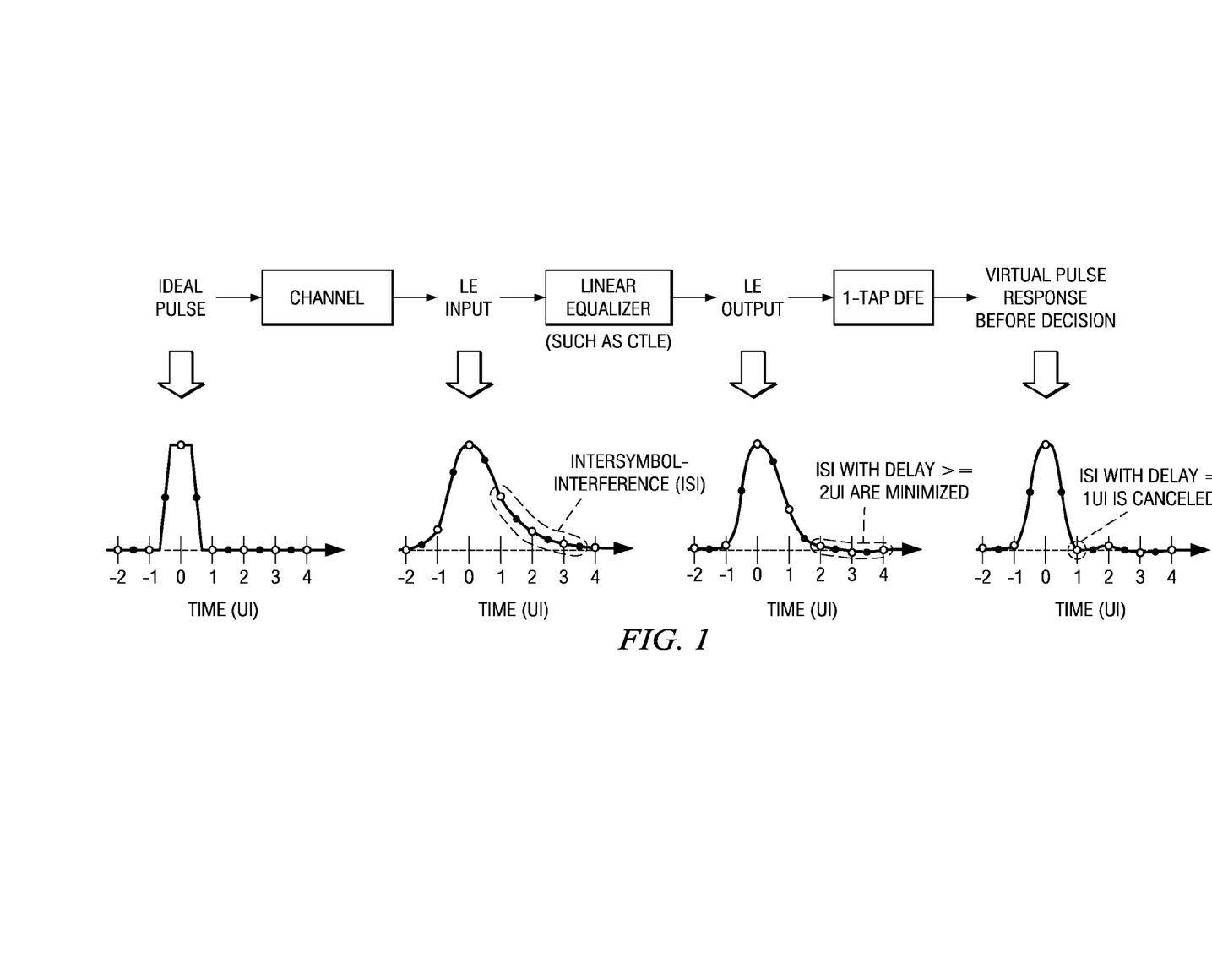
FIG. 1 illustrates example pulse responses of an example transmission channel, an example linear equalizer (LE), and an example DFE.

FIG. 1 illustrates example pulse responses of an example transmission channel, an example LE, and an example DFE. The transmission channel communicates a signal from a transmitter to a receiver that includes the LE and the DFE, which process the received signal. The LE and DFE may communicate the processed signal in any suitable manner to a decision circuit or any other circuit components. After transmission over the channel, the received signal (or pulse) has a long tail due to high-frequency loss in the transmission channel. The long tail causes postcursor ISI because the long tail interferes with successively transmitted symbols. Particular embodiments use an LE to cancel such interference. In particular embodiments, there may be two symbols: such as 0 and 1 or −1 and +1. The present disclosure contemplates any suitable symbols. In FIG. 1, the LE moderately amplifies an attenuated high-frequency component of the received signal to reduce residual ISI occurring after a particular delay. An LE boosts the gain for HF components, but it does not distinguish crosstalk and reflection noise (which are often severe in backplane systems) from the received signal. Crosstalk and reflection are HF noise, and the LE amplifies them together with the received signal. To compensate, the bandwidth of the LE may be reduced to a quarter of the data rate of the received signal. In FIG. 1, the DFE cancels the residual ISI occurring approximately immediately after the pulse. If the DFE is a 1-tap DFE, it may use a feedback loop from a decision circuit in the DFE to cancel residual ISI occurring after a delay of 1.0 UI.

Figure 2:
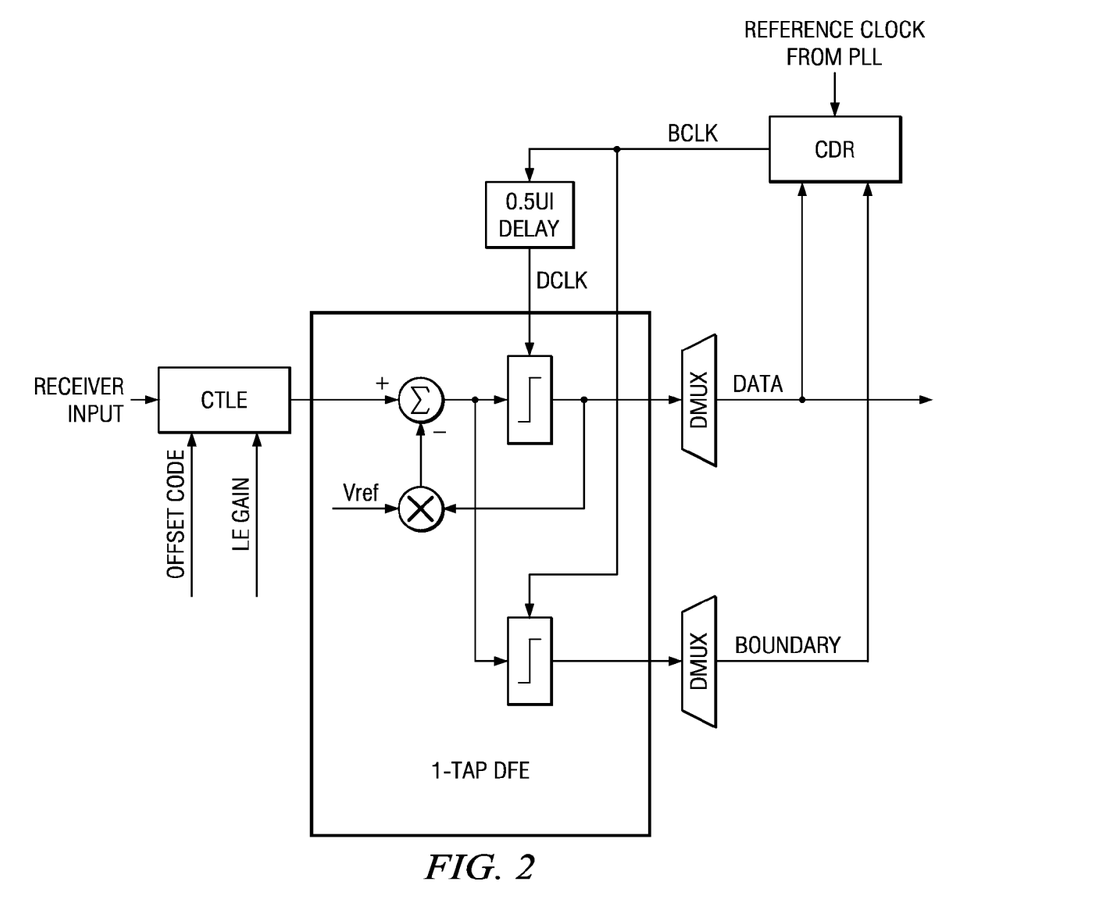
FIG. 2 illustrates an example receiver architecture.
Figure 3:
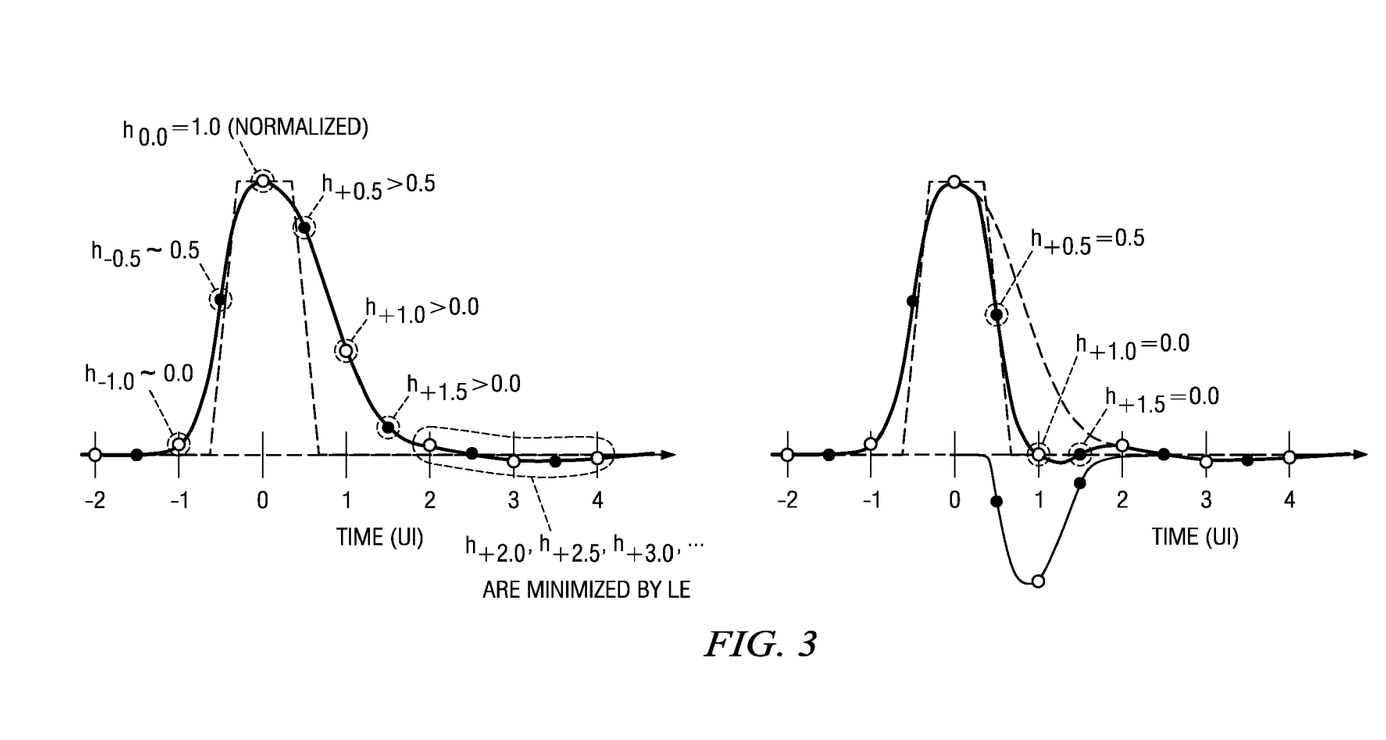
FIG. 3 illustrates example cancellation of intersymbol interference (ISI) by the receiver architecture in FIG. 2.

FIG. 2 illustrates an example receiver architecture that includes a continuous-time linear equalizer (CTLE) and 1-tap DFE with direct feedback. The CTLE cancels precursor ISI and boosts low-to-middle frequency components in the received signal. The 1-tap DFE employs direct feedback to cancel ISI on a 1.0-UI-delayed data value and to cancel ISI on 0.5-UI-delayed and 1.5-UI-delayed boundary values, as FIG. 3 illustrates. In FIG. 2, the clock and data recovery (CDR) circuit takes the outputs of the boundary and data decision latches (DLs), shifts the boundary clock (BCLK) to an earlier or later phase to lock the incoming data boundary. The data clock (DCLK) is delayed 0.5 UIs with respect to BCLK. The DCLK samples at an approximate center of the data eye.

The following is a typical problem with the system of FIG. 2. Feedback from the data slicer must settle before the boundary slicer. As a result, the critical path includes the delay associated with the data slicer Tclk-to-q, the delay associated with multiplication with the reference voltage Vref, the delay associated with the summation, and the setup time of the boundary slicer. The sum of all the delay must be less than 0.5 UIs, which is difficult to achieve at high data rates. As an example and not by way of limitation, for a data rate of 10 Gbps, 0.5 UIs is only 50 picoseconds.

Figure 4:
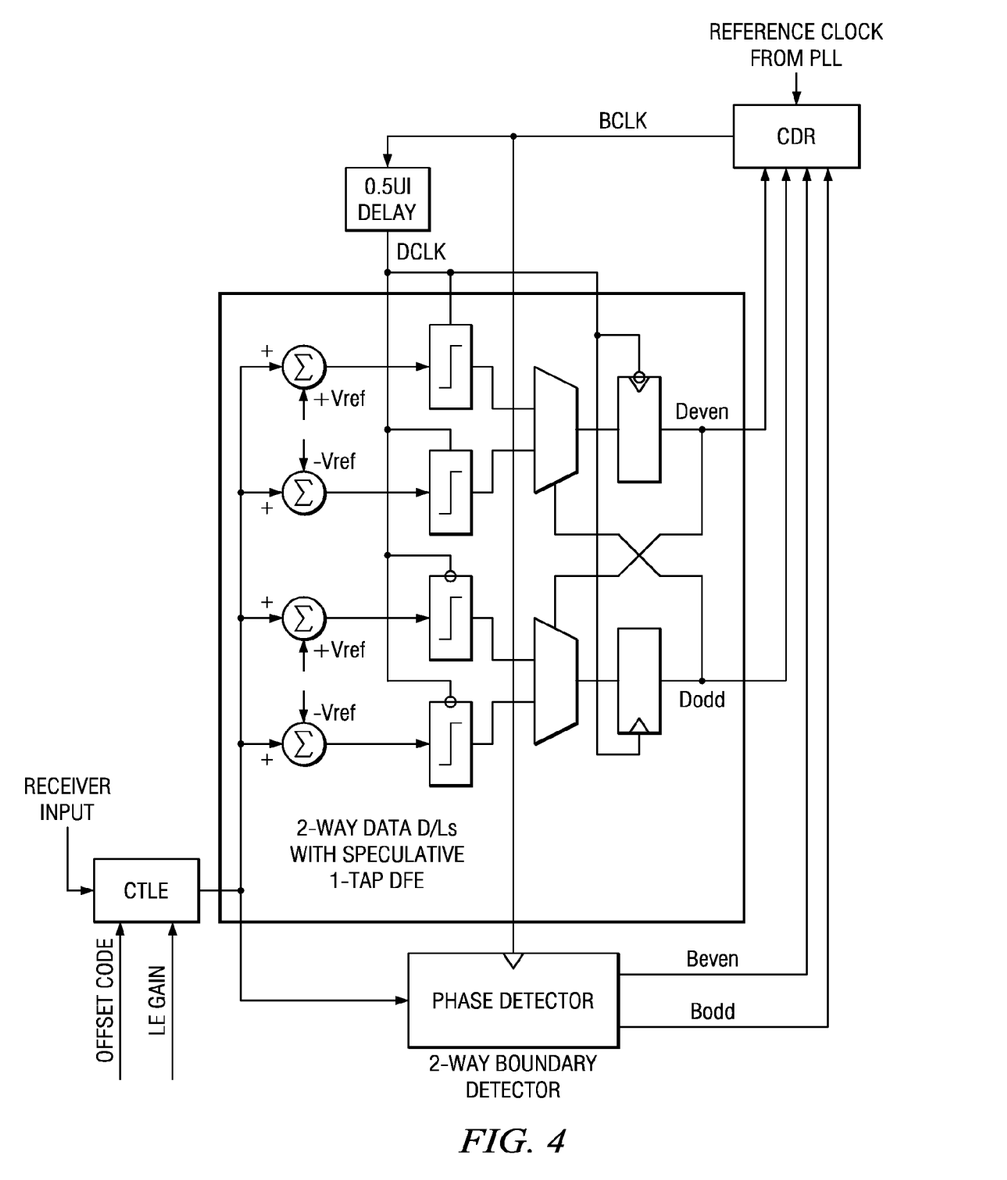
FIG. 4 illustrates another example receiver architecture.
Figure 5:
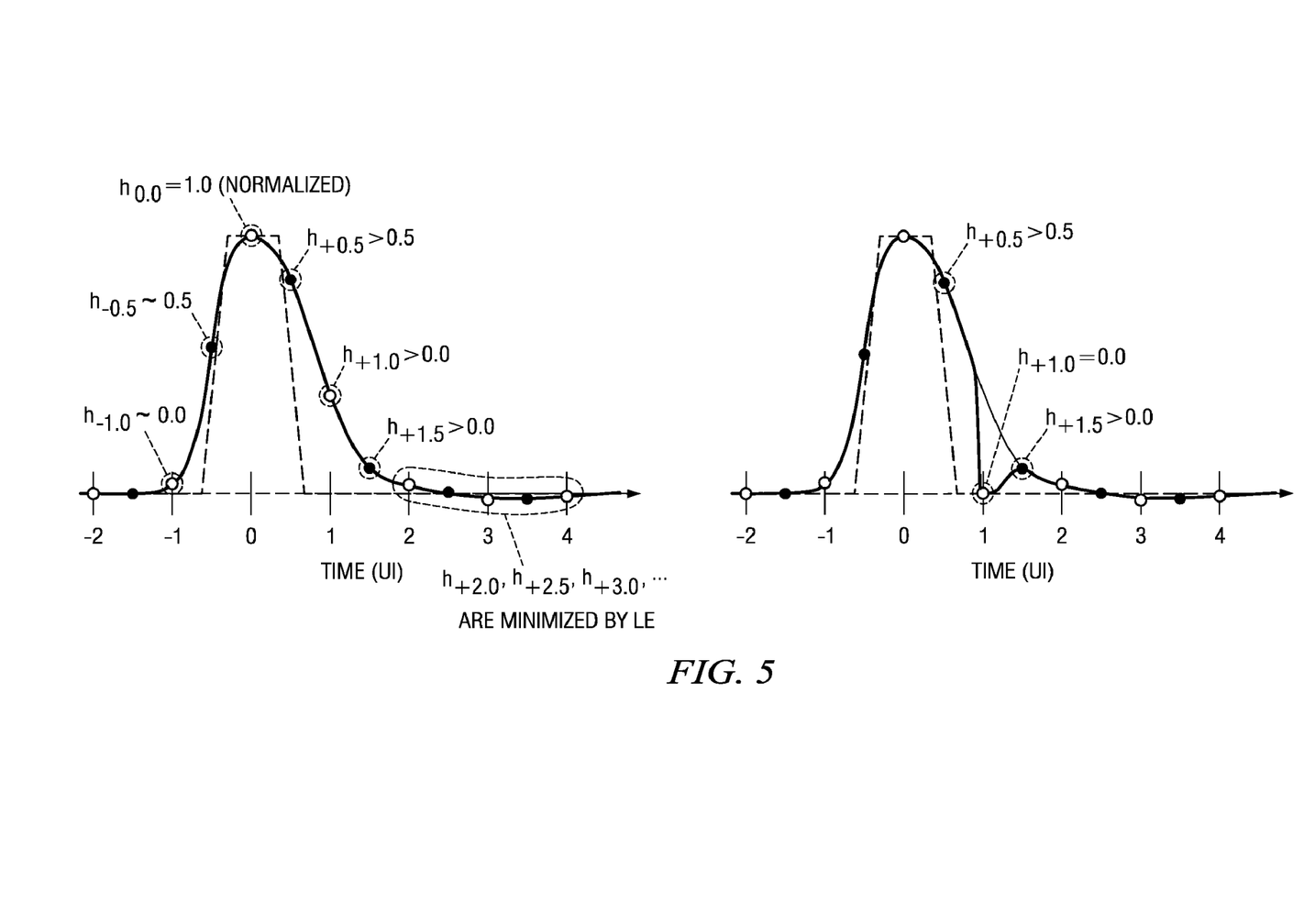
FIG. 5 illustrates example cancellation of ISI by the receiver architecture in FIG. 4.

FIG. 4 illustrates another example receiver architecture that includes a CTLE and a 1-tap DFE. The system of FIG. 4 uses speculative or loop-unfolding techniques to ease the critical timing path. It precalculates an equalized eye for either prior input-data polarity, latches both results, and chooses a result once the previous bit decision is known. The phase detector takes the data without ISI cancellation on the 0.5 UI and 1.5 UI boundaries. The CTLE cancels precursor ISI and boosts low-to-middle frequency components. The 1-tap DFE cancel ISI on 1.0-UI data, as FIG. 5 illustrates. The CDR circuit takes the outputs of the boundary and data DLs, shifts BCLK to an earlier or later phase to lock the incoming data boundary. DCLK is delayed 0.5 UIs with respect to BCLK.

The following is a typical problem with the system of FIG. 4. ISI from the signal received 0.5 UIs prior to the boundary sample produces approximately x UIs of delay in zero crossing. The ISI contribution from the bit received 1.5 UIs before the boundary sample may be written as ±Δ, where the sign depends on the bit that produces the ISI. If binary 1 and binary 0 appear randomly, the CDR loop averages the contribution (+Δ) to zero. So the net contribution of the ISI is x-UI delay. Depending on the amount of ISI, the actual delay x may vary from 0.0 to 0.5 UIs. Uncancelled boundary ISI delays the data boundary, and DCLK is not at a center of the data eye, which reduces timing margin.

Figure 6:
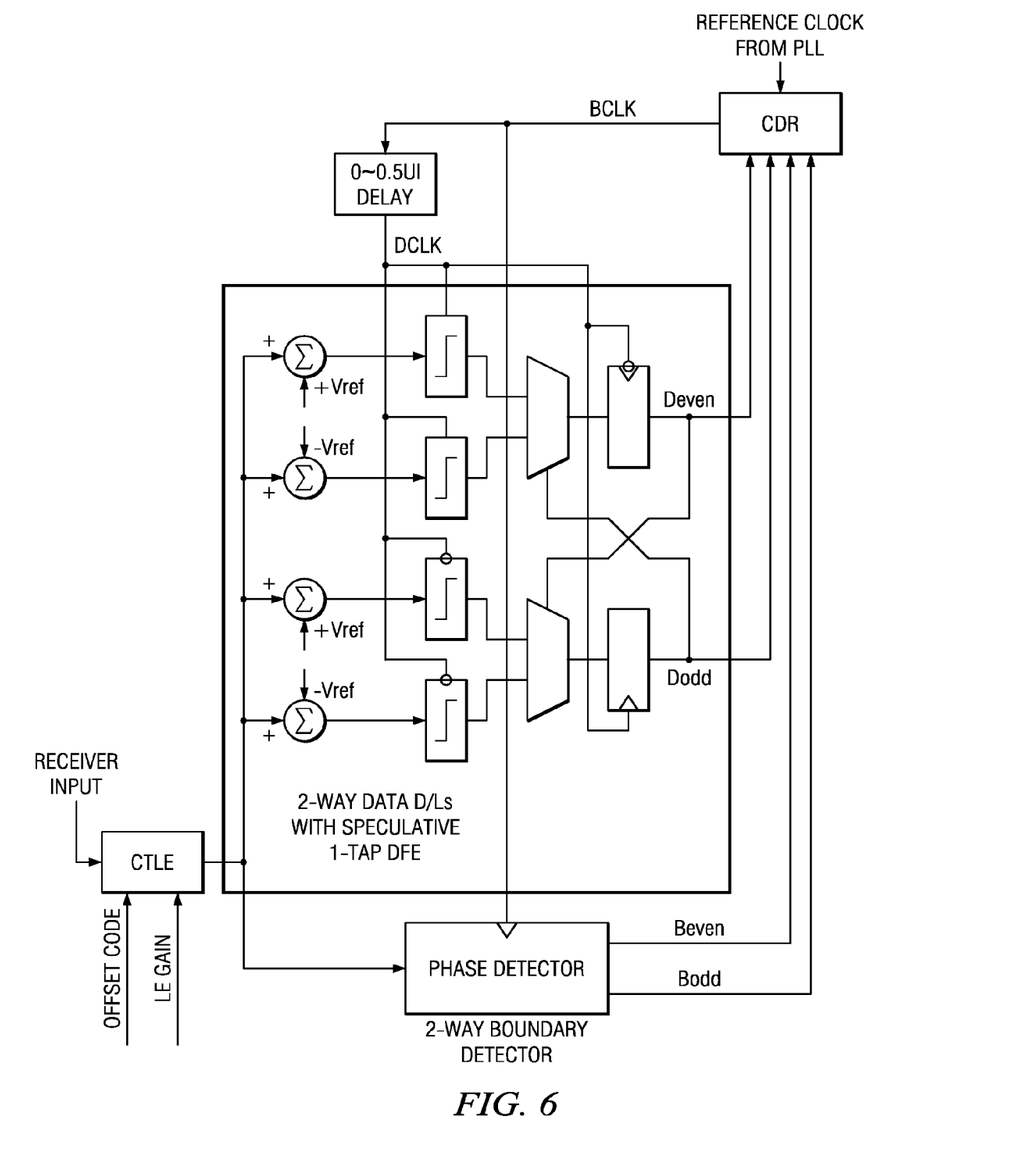
FIG. 6 illustrates another example receiver architecture.
Figure 7:
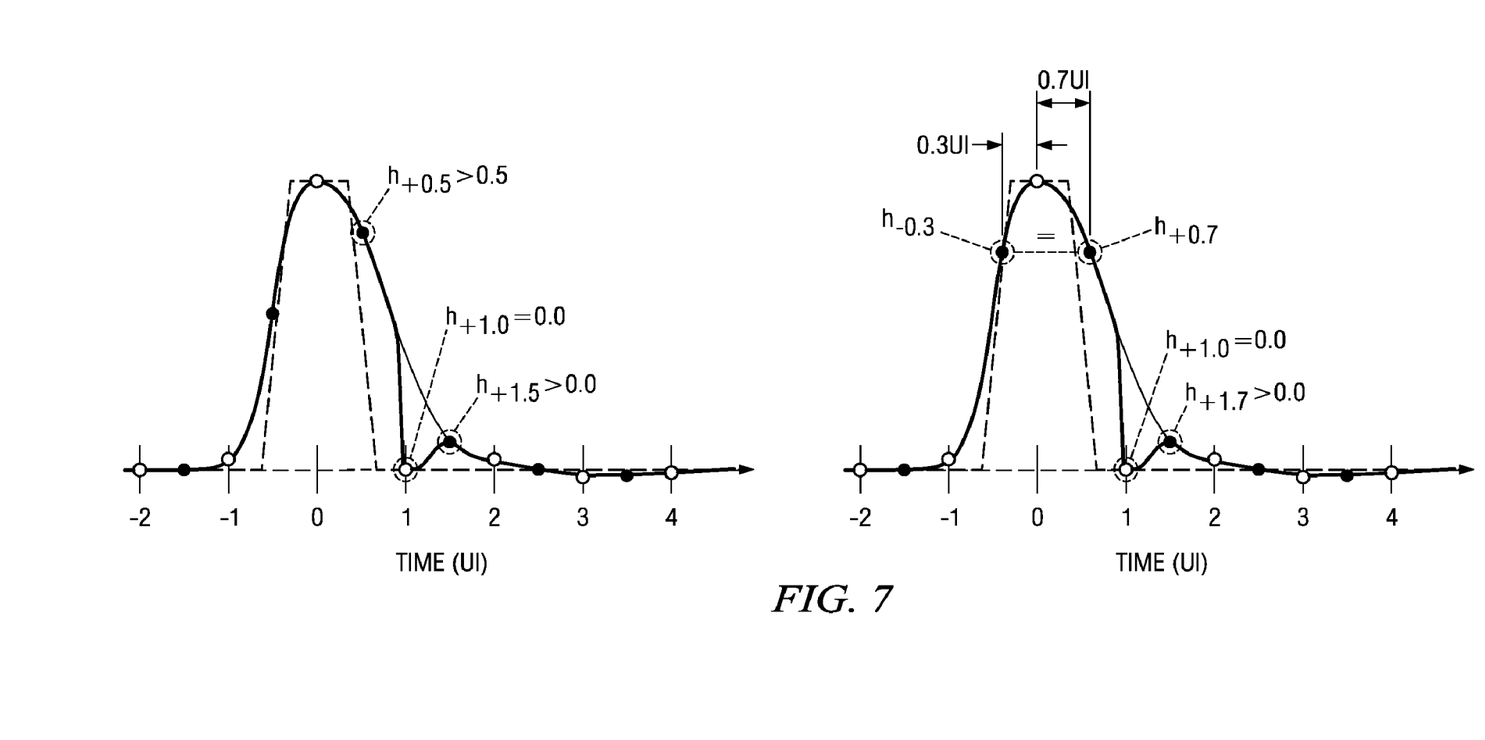
FIG. 7 illustrates example cancellation of ISI by the receiver architecture in FIG. 6.

FIG. 6 illustrates another example receiver architecture. In the system of FIG. 6, DCLK is a delayed version of BCLK. Due to uncancelled boundary ISI, the data boundary is delayed. To make DCLK sample at an approximate center of the data eye, DCLK is delayed less than 0.5 UIs with respect BCLK. In particular embodiments, the minimum possible delay is 0.0 UIs, which completely eliminates the delay circuit. FIG. 7 illustrates example cancellation of ISI by the receiver architecture in FIG. 6. In FIG. 7, 0.3 UIs is an optimal data sampling point. In particular embodiments, such sampling improves timing margin, which is important in high data-rate transmissions. In particular embodiments, compared with the system of FIG. 2, the system of FIG. 6 eases the critical timing path and interleaves the data, which provides a better solution for higher-speed operation. In particular embodiments, compared with the system of FIG. 4, the system of FIG. 6 shifts the data sampling clock to an optimal eye center with little or no design effort. In addition, in particular embodiments, improving timing margin further facilitates higher data-rate transmission.

Figure 8:
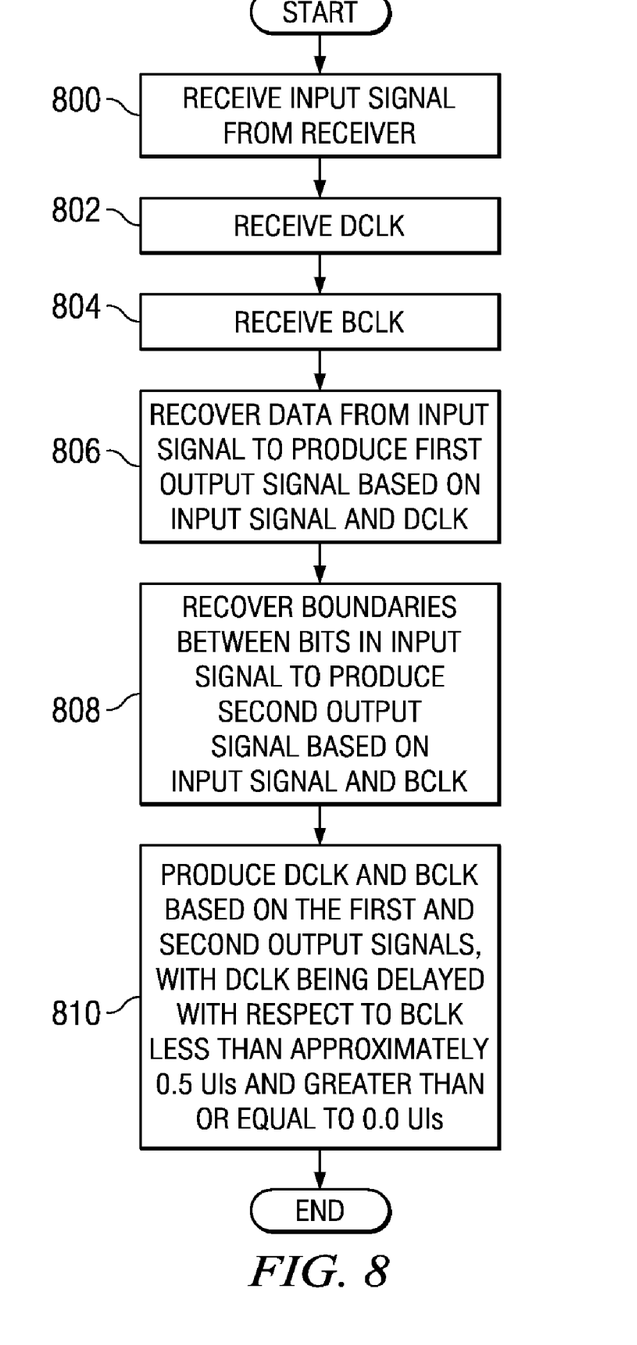
FIG. 8 illustrates an example DFE method.

FIG. 8 illustrates an example DFE method. The method begins at step 800, where a data DL and boundary DL receive an input signal from a receiver. The input signal includes ISI when communicated from the receiver. At step 802, the data DL receives a DCLK signal. At step 804, the boundary DL receives a BCLK signal. At step 806, based on the input signal and the DCLK signal, the data DL recovers data from the input signal to produce a first output signal. At step 808, based on the input signal and the BCLK signal, the boundary DL recovers boundaries between bits in the input signal to produce a second output signal. At step 810, based on the first and second output signals, a CDR circuit produces the DCLK and BCLK signals, with the DCLK signal being delayed with respect to the BCLK signal less than approximately 0.5 unit intervals (UIs) and greater than or equal to approximately zero UIs, at which point the method ends. Particular embodiments may continuously repeat the steps of the method of FIG. 8, according to particular needs. Although the present disclosure describes and illustrates particular steps of the method of FIG. 8 as occurring in a particular order, the present disclosure contemplates any suitable steps of the method of FIG. 8 occurring in any suitable order. Although the present disclosure describes and illustrates particular components carrying out particular steps of the method of FIG. 8, the present disclosure contemplates any suitable components carrying out any suitable steps of the method of FIG. 8.

The present disclosure encompasses all changes, substitutions, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A system comprising:
   a data decision latch (DL) comprising a decision feedback equalizer (DFE) and a data slicer and being operable to:
      receive an input signal from a receiver, the input signal comprising intersymbol interference (ISI) when communicated from the receiver;
      receive a data clock (DCLK) signal; and
      based on the input signal and the DCLK signal, recover data from the input signal to produce a first output signal;
   a boundary DL comprising a boundary slicer and excluding a DFE and being operable to:
      receive the input signal from the receiver;
      receive a boundary clock (BCLK) signal; and
      based on the input signal and the BCLK signal, recover boundaries between bits in the input signal to produce a second output signal; and
   a clock and data recovery (CDR) circuit operable to:
      receive the first and second output signals; and
      based on the first and second output signals, produce the DCLK and BCLK signals, with the DCLK signal being delayed with respect to the BCLK signal less than 0.5 unit intervals (UIs) and greater than or equal to zero UIs.

2. The system of claim 1, wherein, to produce the DCLK signal, the CDR circuit is operable to produce first the BCLK signal based on the first and second output signals and then delay the BCLK signal by between less than 0.5 UIs and greater than or equal to zero UIs.

3. The system of claim 1, wherein, to produce the BCLK signal, the CDR circuit is operable to produce first the DCLK signal based on the first and second output signals and then delay the DCLK signal by between greater than 0.5 UIs and less than or equal to one UI.

4. The system of claim 1, wherein:
   to produce the BCLK signal, the CDR circuit is operable to delay a common reference clock signal by a first delay; and
   to produce the DCLK signal, the CDR circuit is operable to delay the common reference clock signal by a second delay;
   a difference between the first and second delays causing the DCLK signal to be delayed with respect to the BCLK signal less than 0.5 UIs and greater than or equal to zero UIs.

5. The system of claim 1, wherein:
   to produce the BCLK signal, the CDR circuit is operable to merge first and second 90° phase-shifted reference clock signals with each other at a first weight ratio; and
   to produce the DCLK signal, the CDR circuit is operable to merge the first and second 90° phase-shifted reference clock signals at a second weight ratio;
   a difference between the first and second weight ratios causing the DCLK signal to be delayed with respect to the BCLK signal less than 0.5 UIs and greater than or equal to zero UIs.

6. The system of claim 1, wherein the data and boundary DLs are operable to receive the input signal from the receiver via a continuous-time linear equalizer (CTLE) that is operable to substantially cancel the ISI in the input signal.

7. The system of claim 1, wherein the delay from the DCLK signal to the BCLK signal is essentially 0.3 UIs.

8. The system of claim 1, wherein the DFE in the data DL is a speculative 1-tap DFE.

9. The system of claim 1, wherein the data DL is an interleaved data DL, the boundary DL is an interleaved boundary DL, and the DCLK and BCLK signals are sub-rate clock signals.

10. The system of claim 1, wherein the CDR circuit is operable to produce the DCLK and BCLK signals based on a reference clock signal in addition to the first and second output signals.

11. A method comprising:
by a data decision latch (DL) comprising a decision feedback equalizer (DFE) and a data slicer:
receiving an input signal from a receiver, the input signal comprising intersymbol interference (ISI) when communicated from the receiver;
receiving a data clock (DCLK) signal; and
based on the input signal and the DCLK signal, recovering data from the input signal to produce a first output signal;
by a boundary DL comprising a boundary slicer and excluding a DFE:
receiving the input signal from the receiver;
receiving a boundary clock (BCLK) signal; and
based on the input signal and the BCLK signal, recovering boundaries between bits in the input signal to produce a second output signal; and
by a clock and data recovery (CDR) circuit:
receiving the first and second output signals; and
based on the first and second output signals, producing the DCLK and BCLK signals, with the DCLK signal being delayed with respect to the BCLK signal less than 0.5 unit intervals (UIs) and greater than or equal to zero UIs.

12. The method of claim 11, wherein producing the DCLK signal comprises producing first the BCLK signal based on the first and second output signals and then delaying the BCLK signal by between less than 0.5 UIs and greater than or equal to zero UIs.

13. The method of claim 11, wherein producing the BCLK signal comprises producing first the DCLK signal based on the first and second output signals and then delaying the DCLK signal by between greater than 0.5 UIs and less than or equal to one UI.

14. The method of claim 11, wherein:
producing the BCLK signal comprises delaying a common reference clock signal by a first delay; and
producing the DCLK signal comprises delaying the common reference clock signal by a second delay;
a difference between the first and second delays causing the DCLK signal to be delayed with respect to the BCLK signal less than 0.5 UIs and greater than or equal to zero UIs.

15. The method of claim 11, wherein:
producing the BCLK signal comprises merging first and second 90° phase-shifted reference clock signals with each other at a first weight ratio; and
producing the DCLK signal comprises merging the first and second 90° phase-shifted reference clock signals at a second weight ratio;
a difference between the first and second weight ratios causing the DCLK signal to be delayed with respect to the BCLK signal less than 0.5 UIs and greater than or equal to zero UIs.

16. The method of claim 11, further comprising receiving by the data and boundary DLs the input signal from the receiver via a continuous-time linear equalizer (CTLE) that is operable to substantially cancel the ISI in the input signal.

17. The method of claim 11, wherein the delay from the DCLK signal to the BCLK signal is essentially 0.3 UIs.

18. The method of claim 11, wherein the DFE in the data DL is a speculative 1-tap DFE.

19. The method of claim 11, wherein the data DL is an interleaved data DL, the boundary DL is an interleaved boundary DL, and the DCLK and BCLK signals are sub-rate clock signals.

20. The method of claim 11, wherein the CDR circuit is operable to produce the DCLK and BCLK signals based on a reference clock signal in addition to the first and second output signals.

21. A system comprising:
means for receiving an input signal from a receiver, the input signal comprising intersymbol interference (ISI) when communicated from the receiver;
means for receiving a data clock (DCLK) signal;
means for receiving a boundary clock (BCLK) signal;
means for, based on the input signal and the DCLK signal, recovering data from the input signal to produce a first output signal;
means for, based on the input signal and the BCLK signal, recovering boundaries between bits in the input signal to produce a second output signal; and
means for, based on the first and second output signals, producing the DCLK and BCLK signals, with the DCLK signal being delayed with respect to the BCLK signal less than 0.5 unit intervals (UIs) and greater than or equal to zero UIs.

* * * * *